(12) United States Patent
Hung et al.

(10) Patent No.: US 11,267,167 B2
(45) Date of Patent: Mar. 8, 2022

(54) METHOD FOR MANUFACTURING MOLD TOOLING

(71) Applicant: ATT Southern, Inc., Camp Hill, PA (US)

(72) Inventors: Chun Wai Hung, Dillsburg, PA (US); Brian Leahy, Atlanta, GA (US)

(73) Assignee: ATT Southern, Inc., Camp Hill, PA (US)

( * ) Notice: Subject to any disclaimer, the term of this patent is extended or adjusted under 35 U.S.C. 154(b) by 428 days.

(21) Appl. No.: 16/190,497

(22) Filed: Nov. 14, 2018

(65) Prior Publication Data

US 2020/0147838 A1 May 14, 2020

(51) Int. Cl.
*B29C 45/00* (2006.01)
*B29D 22/00* (2006.01)
(Continued)

(52) U.S. Cl.
CPC ............ *B29C 33/3842* (2013.01); *A01G 9/02* (2013.01); *A01G 9/021* (2013.01); *B29C 33/3835* (2013.01); *B29D 22/003* (2013.01); *B29C 2795/007* (2013.01); *B29K 2101/12* (2013.01); *B29K 2905/00* (2013.01); *B29L 2022/00* (2013.01); *B29L 2031/7004* (2013.01); *B29L 2031/7136* (2013.01); *B29L 2031/757* (2013.01); *G01N 23/046* (2013.01); *G06F 30/00* (2020.01); *G06F 30/10* (2020.01); *G06F 2113/20* (2020.01); *G06T 17/00* (2013.01)

(58) Field of Classification Search
CPC . B29C 33/3835; B29C 33/3842; B29C 45/00; B29C 2795/007; B29D 22/00; B29D 22/003; B29K 2101/12; B29L 2022/00; B29L 2031/7004; B29L 2031/7136; B29L 2031/757; G01N 23/046; G06F 30/00; G06F 30/10; G06F 2113/20; G06T 17/00
USPC ..... 264/129, 132, 219, 328.1; 378/4; 700/98
See application file for complete search history.

(56) References Cited

U.S. PATENT DOCUMENTS 6,044,585 A * 4/2000 Carruth .................... A01G 9/02
47/65.5
6,788,984 B2 9/2004 Plotkin
(Continued)

FOREIGN PATENT DOCUMENTS

| CN | 201726697 U | 2/2011 | |
|---|---|---|---|
| CN | 106885517 A * | 6/2017 | ............ G01B 11/00 |
| CN | 107856466 A | 3/2018 | |

OTHER PUBLICATIONS

Translation of CN 106885517 A (published on Jun. 23, 2017).*

*Primary Examiner* — Leo B Tentoni
(74) *Attorney, Agent, or Firm* — Brooks Kushman P.C.

(57) ABSTRACT

A molded pot is provided with imperfections manufactured by manufacturing mold tooling with imperfections by obtaining a handmade pot. The handmade pot is scanned to obtain geometric data. The geometric data is converted to mold tooling geometric data. Mold tooling is manufactured from the mold tooling geometric data. The handmade pot is obtained with imperfections. The handmade pot is scanned to obtain the geometric data of the handmade pot with the imperfections. The geometric data is converted to mold tooling geometric data with the imperfections. The mold tooling is manufactured with imperfections. A pot is molded with imperfections from the mold tooling.

14 Claims, 6 Drawing Sheets

(51) Int. Cl.
- *B29C 33/38* (2006.01)
- *A01G 9/02* (2018.01)
- *B29L 31/00* (2006.01)
- *G01N 23/046* (2018.01)
- *G06F 30/00* (2020.01)
- *G06T 17/00* (2006.01)
- *G06F 30/10* (2020.01)
- *G06F 113/20* (2020.01)
- *B29K 101/12* (2006.01)
- *B29L 22/00* (2006.01)

(56) References Cited

U.S. PATENT DOCUMENTS

| | | | |
|---|---|---|---|
| 6,887,406 B2 | 5/2005 | Rice et al. | |
| 9,926,131 B1 * | 3/2018 | Lehmann | G06Q 10/087 |
| 2005/0091921 A1 * | 5/2005 | Weder | A47G 7/08 |
| | | | 47/72 |
| 2008/0115412 A1 * | 5/2008 | Armstrong | B29C 41/22 |
| | | | 47/41.01 |
| 2011/0266708 A1 | 11/2011 | Wang | |
| 2014/0228997 A1 * | 8/2014 | Phillips | G06F 30/00 |
| | | | 700/182 |

\* cited by examiner

METHOD FOR MANUFACTURING MOLD TOOLING

TECHNICAL FIELD

Various embodiments relate to molded pots.

BACKGROUND

The prior art has provided handmade pots for potting plants and the like. The prior art has also provided molded pots for potting plants and the like.

SUMMARY

According to at least one embodiment, a method for manufacturing mold tooling obtains a handmade pot. The handmade pot is scanned to obtain geometric data. The geometric data is converted to mold tooling geometric data. Mold tooling is manufactured from the mold tooling geometric data.

According to a further embodiment, the handmade pot is painted before the handmade pot is scanned.

According to a further embodiment, the handmade pot is painted with a flat or matte paint before the handmade pot is scanned.

According to a further embodiment, the handmade pot is obtained formed from ceramic, wood, concrete or stone.

According to a further embodiment, the handmade pot is obtained with external surface decorations comprising ropes, wicker, vines or leaves.

According to a further embodiment, the handmade pot is obtained with surface ornamentation including cracked paint.

According to a further embodiment, the handmade pot is obtained of non-Euclidian geometry.

According to an even further embodiment, the non-Euclidian geometry is converted to Euclidian geometry.

According to a further embodiment, the handmade pot is obtained with imperfections.

According to an even further embodiment, the handmade pot is scanned to obtain the geometric data of the handmade pot with the imperfections.

According to an even further embodiment, the geometric data is converted to mold tooling geometric data with the imperfections.

According to an even further embodiment, the mold tooling is manufactured with imperfections.

According to at least another embodiment, a method for manufacturing a pot, manufactures mold tooling with imperfections by obtaining a handmade pot. The handmade pot is scanned to obtain geometric data. The geometric data is converted to mold tooling geometric data. Mold tooling is manufactured from the mold tooling geometric data. The handmade pot is obtained with imperfections. The handmade pot is scanned to obtain the geometric data of the handmade pot with the imperfections. The geometric data is converted to mold tooling geometric data with the imperfections. The mold tooling is manufactured with imperfections. A pot is molded with imperfections from the mold tooling.

According to at least another embodiment, a molded pot is provided with imperfections manufactured by manufacturing mold tooling with imperfections by obtaining a handmade pot. The handmade pot is scanned to obtain geometric data. The geometric data is converted to mold tooling geometric data. Mold tooling is manufactured from the mold tooling geometric data. The handmade pot is obtained with imperfections. The handmade pot is scanned to obtain the geometric data of the handmade pot with the imperfections. The geometric data is converted to mold tooling geometric data with the imperfections. The mold tooling is manufactured with imperfections. A pot is molded with imperfections from the mold tooling.

According to a further embodiment, the molded pot is formed from a polymeric material.

According to a further embodiment, the molded pot is formed from a ceramic material.

According to at least another embodiment, mold tooling is formed from by obtaining a handmade pot. The handmade pot is scanned to obtain geometric data. The geometric data is converted to mold tooling geometric data. Mold tooling is manufactured from the mold tooling geometric data.

According to at least another embodiment, mold tooling is manufactured from a method that obtains a handmade pot. The handmade pot is scanned to obtain geometric data. The geometric data is converted to mold tooling geometric data. Mold tooling is manufactured from the mold tooling geometric data.

According to at least another embodiment, a method for manufacturing a pot manufactures mold tooling by obtaining a handmade pot. The handmade pot is scanned to obtain geometric data. The geometric data is converted to mold tooling geometric data. Mold tooling is manufactured from the mold tooling geometric data. A pot is molded from the mold tooling.

According to at least another embodiment, a molded pot is manufactured from a method that manufactures mold tooling by obtaining a handmade pot. The handmade pot is scanned to obtain geometric data. The geometric data is converted to mold tooling geometric data. Mold tooling is manufactured from the mold tooling geometric data. A pot is molded from the mold tooling.

According to at least another embodiment, a molded pot is provided with a body with inconsistent geometries and surface ornamentation to provide an ornamental appearance of a handmade pot.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The prior art has provided handmade pots for potting and planters. The prior art has also provided molded planters that are manufactured from uniform and consistent shapes. The conventional molded planters can be mass produced and consequently are less expensive. The natural and presentable ornamental appearance of a handmade pot may be desired by some consumers; however, the more expensive cost is not as desirable as the molded pot. A method for manufacturing a molded pot with the imperfections and inconsistencies of a handmade pot is developed to provide the desired characteristics of both the handmade pot and the molded pot.

Figure 1:
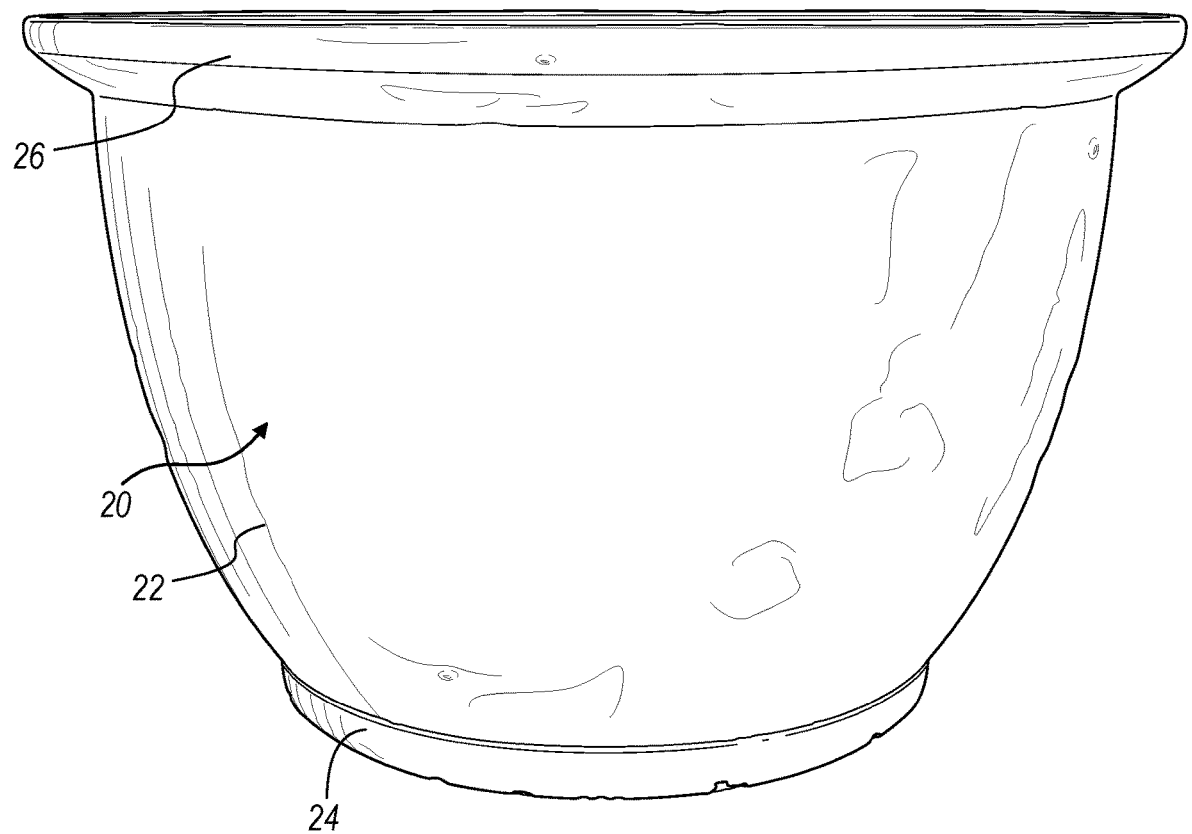
FIG. 1 is a front perspective view of a handmade pot according to an embodiment.

FIG. 1 illustrates an authentic, ceramic handmade planter or pot 20 according to an embodiment. The pot 20 can be employed for potting, planting, decorating and the like. The pot 20 has a generally hollow body 22 with a round cross section and an enlarging curved taper from a lower annular base 24 to an upper outwardly extending rim 26. The pot 20 does not have a consistently smooth or uniform external surface. The pot 20 includes imperfections such as depressions in the exterior of the body 22 and the rim 26 due to the manual process for forming the pot 20. The pot 20 also includes chips in the base 24. Such imperfections are desired by consumers for an authentic and organic ornamental appearance typically associated with handmade pots 20. In mathematical terms, the pot is not manufactured from fixed, repeatable processes and as such, the pot is formed from free flow or non-Euclidian geometry.

Figure 2:
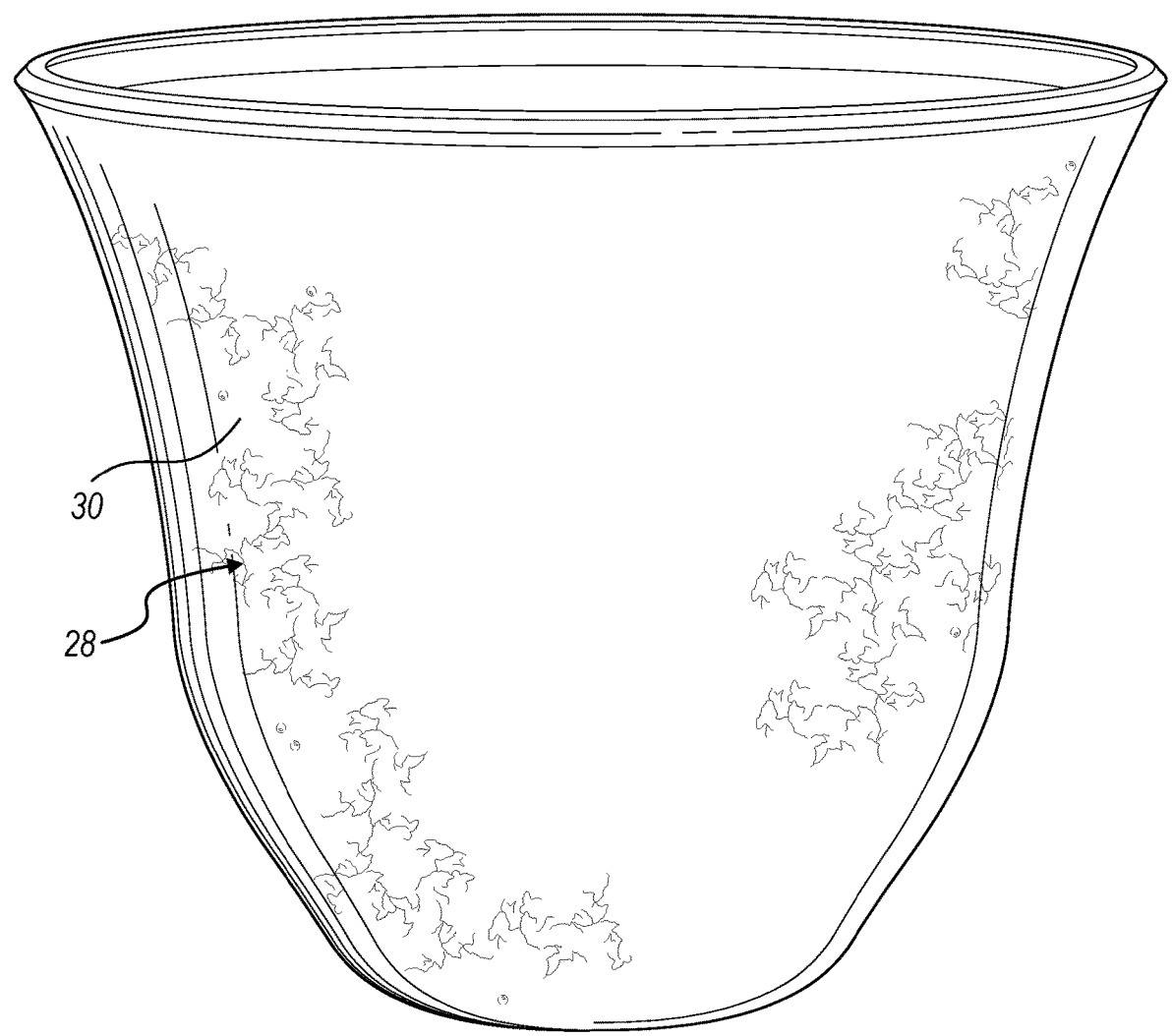
FIG. 2 is a front perspective view of a handmade pot according to another embodiment.

FIG. 2 illustrates another authentic, ceramic handmade pot 28 according to another embodiment. The pot 28 has a generally hollow body 30 with multiple tapers. The pot 28 includes a hollow body 30 with surface ornamentation that includes a cracked paint. Cracked paint is another surface ornamentation that is aesthetically desirable and associated with authenticity and antiquity.

Although the handmade pots 20, 28 are described as ceramic, any suitable pot material may be employed, such as wood, stone, concrete, glass-reinforced concrete, and the like. Additionally, any objects or textures that are not easily created by computer-aided design (CAD) software may be utilized, such as ropes, wickers, vines, leaves, fern leaves, and the like.

After obtaining a handmade pot 20, 28 of one or both of the embodiments of FIGS. 1 and 2, the handmade pot 20, 28 is painted with a flat paint. Alternatively, the handmade pot is painted with a matte paint. Subsequently, the handmade pot 20, 28 is scanned with a scanner to obtain geometric data of the handmade pot 20, 28. Any suitable scanner may be employed, such as a three-dimensional (3D) scanner. The handmade pot 20, 28 is scanned to obtain the geometric data of the handmade pot 20, 28 including the imperfections. The entire handmade pot 20, 28 may be scanned, such as 360 degrees, or a radial section of the pot 20, 28 may be scanned. By scanning the pot 20, 28, geometric data is captured with tangent continuities of textures and surfaces.

Figure 3:
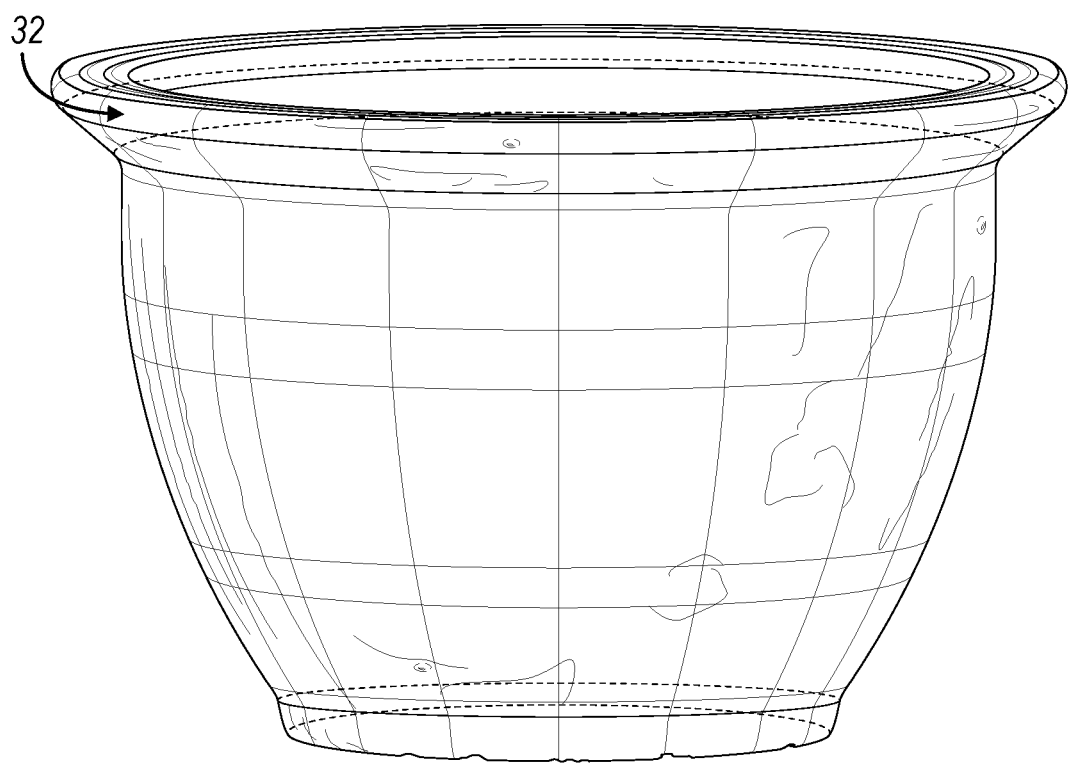
FIG. 3 is a front perspective view of geometric data obtained from the handmade pot of FIG. 1.

The scanning converts the geometry of the pot 20, 28 to formulaic or Euclidean geometry within the CAD software. FIG. 3 is a solid rendering of the geometric data 32 obtained by scanning the pot 20 of FIG. 1. As illustrated in the Figure, the geometric data 32 includes the imperfections of the handmade pot, such as dimples, indents, chips, and the like. The scanned geometric data 32 is utilized to manufacture pots with an appearance that is more natural and presentable than prior art pots with uniform, continuous, flawless surfaces.

Figure 4:
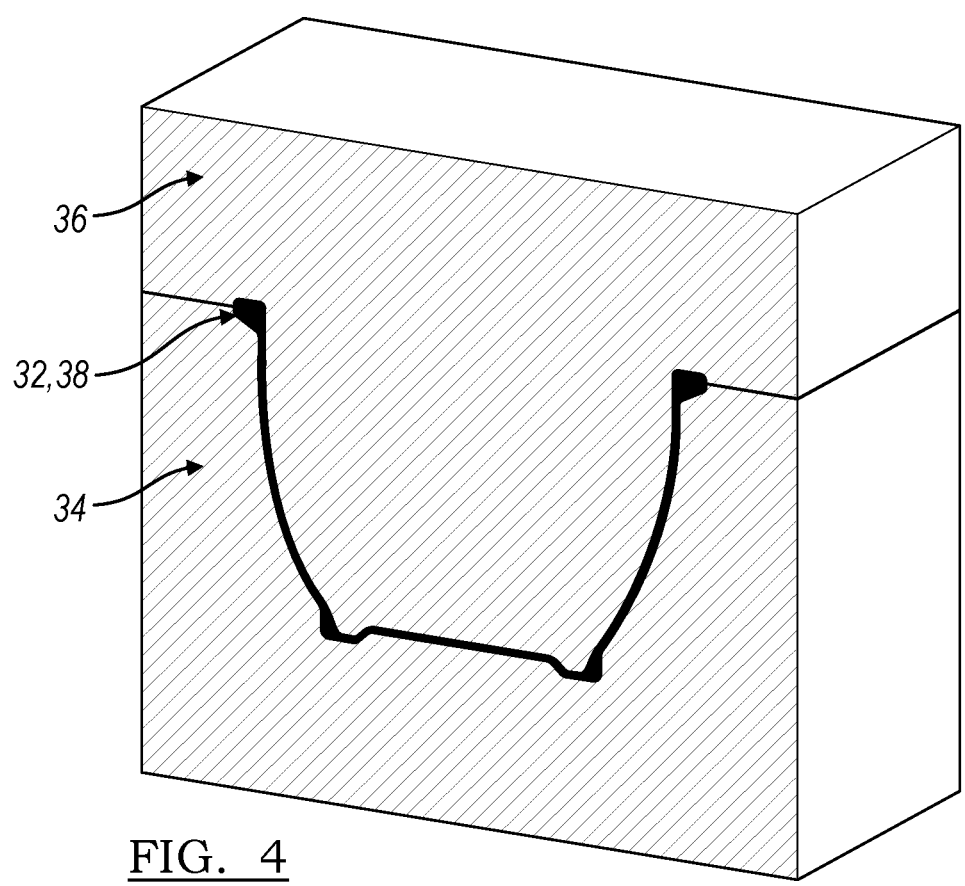
FIG. 4 is a side perspective section view of mold tooling and a molded pot according to an embodiment.
Figure 5:
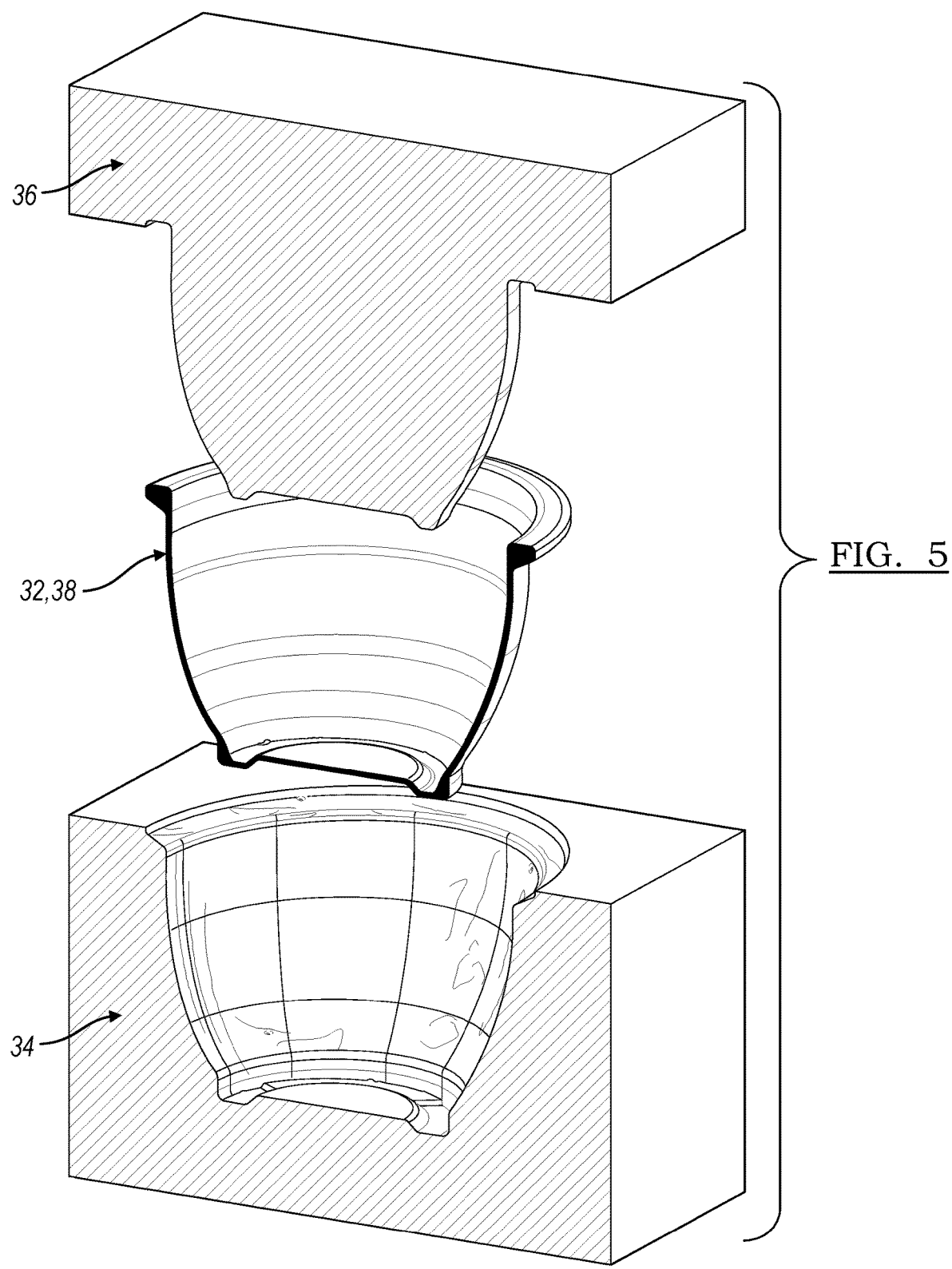
FIG. 5 is an exploded side perspective section view of the mold tooling and the molded pot of FIG. 4.

The geometric data 32 is utilized to fabricate mold tooling to manufacture a pot from the geometric data 32. FIGS. 4 and 5 illustrate a section view of geometric data 32 for the development of mold tooling including a mold cavity 34 and a mold core 36. The mold cavity 34 and the mold core 36 are formed in the inverse of the geometric data 32 to collectively provide molding surfaces to collectively mold a pot 38 from the mold tooling 34, 36. The mold cavity 34 and the mold core 36 are manufactured similarly to prior art mold tooling. For example, the mold cavity 34 and the mold core 36 are machined from metal from the geometric data generated for the mold tooling 34, 36. However, the mold cavity 34 and the mold core 36 include the imperfections to create replicas of the handmade pot 20.

The mold cavity 34 and the mold core 36 are utilized to injection mold replica pots 38 from an injection molded polymer. Alternatively, the mold tooling 34, 36 may be utilized to form the replica pots 38 from a ceramic material, or any other suitable pot material.

Figure 6:
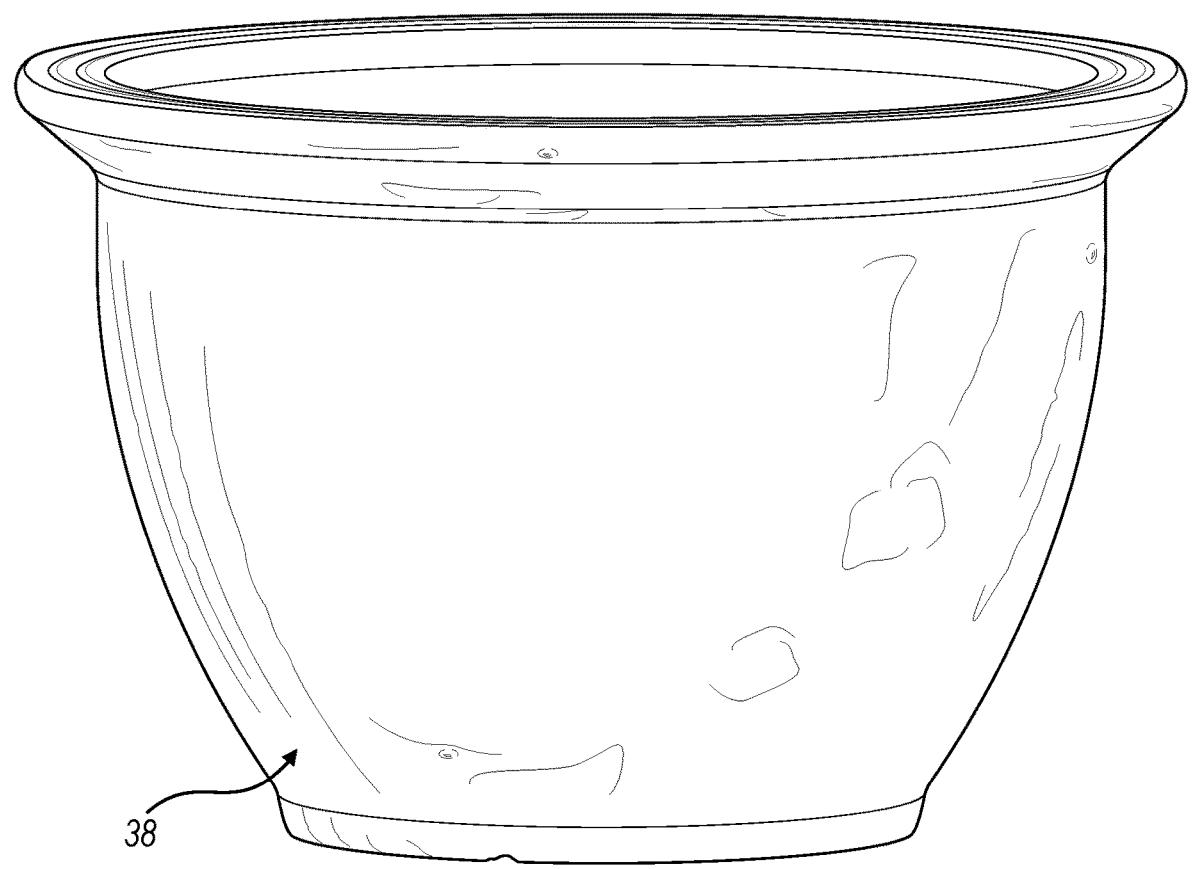
FIG. 6 is a side perspective view of the molded pot of FIG. 4.

FIG. 6 illustrates the molded pot 38 formed from the mold tooling 34, 36. The molded pot 38 has external surfaces with inconsistent geometries and surface ornamentation to provide an ornamental appearance of the handmade pot 20.

Figure 7:
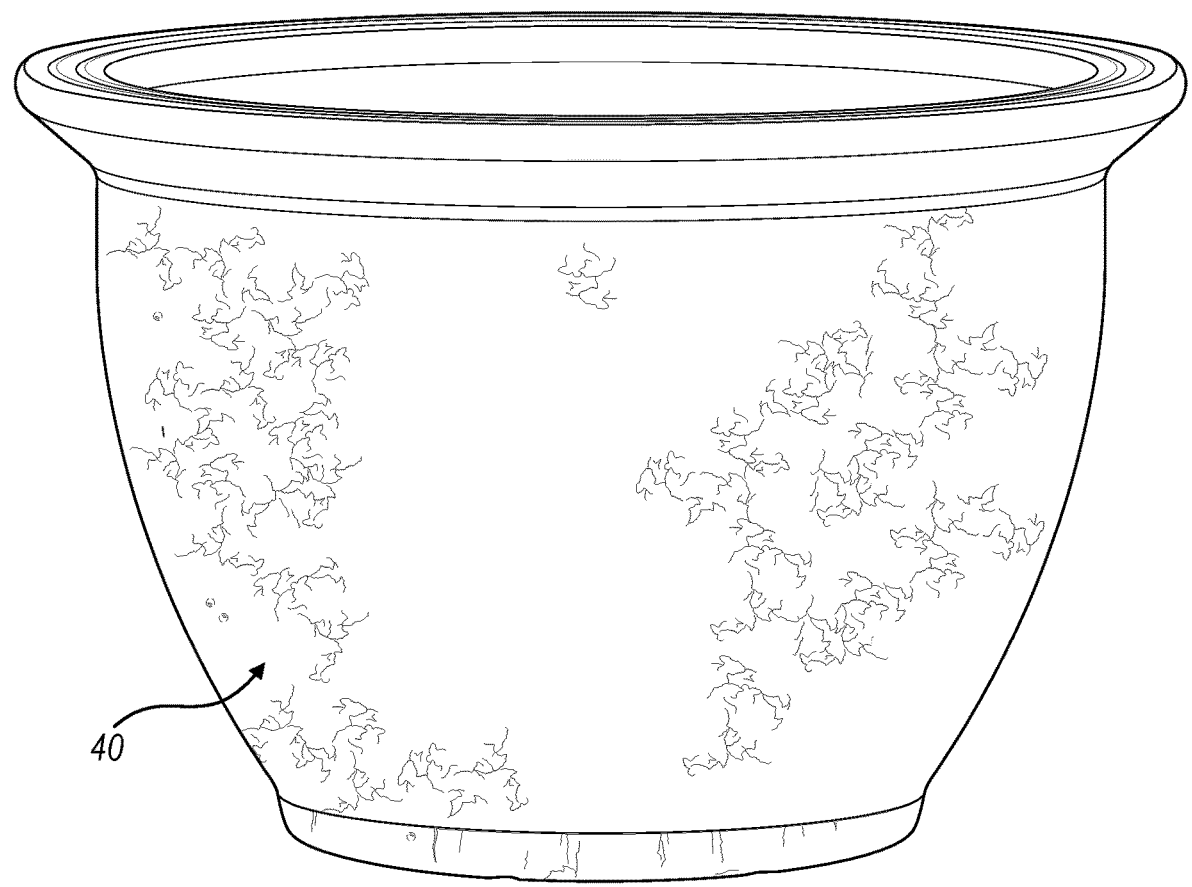
FIG. 7 is a side perspective view a molded pot according to another embodiment.

FIG. 7 illustrates a molded pot 40 according to another embodiment. The molded pot 40 is formed as a replica of a handmade pot with cracked paint. The molded pot 40 is molded with surface cracks indicative of cracked paint.

The molded pots of 38, 40 include various ornamental features associated with the authenticity of handmade pots. However, since the pots 38, 40 are molded, the manufacturing costs are significantly reduced, thereby providing cost-effective replicas of handmade pots.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for manufacturing mold tooling, the method comprising:
   obtaining a handmade pot with imperfections;
   scanning the handmade pot to obtain geometric data of the handmade pot with the imperfections;
   converting the geometric data to mold tooling geometric data with the imperfections; and
   manufacturing mold tooling with imperfections from the mold tooling geometric data.

2. The method of claim 1 further comprising painting the handmade pot before scanning the handmade pot.

3. The method of claim 1 further comprising painting the handmade pot with a flat or matte paint before scanning the handmade pot.

4. The method of claim 1 further comprising obtaining the handmade pot formed from ceramic, wood, concrete or stone.

5. The method of claim 1 further comprising obtaining the handmade pot with external surface decorations comprising ropes, wicker, vines or leaves.

6. The method of claim 1 further comprising obtaining the handmade pot with surface ornamentation including cracked paint.

7. The method of claim 1 further comprising obtaining the handmade pot of non-Euclidian geometry.

8. The method of claim 7 further comprising converting the non-Euclidian geometry to Euclidian geometry.

9. A method for manufacturing a handmade pot, the method comprising:
   manufacturing mold tooling with imperfections according to claim 1; and
   molding a pot with imperfections from the mold tooling.

10. A method for manufacturing a pot, the method comprising:
    manufacturing mold tooling according to claim 1; and
    molding a pot from the mold tooling.

11. The method of claim 1 further comprising manufacturing the mold tooling with imperfections of depressions, dimples, indents, chips, or cracks, from the mold tooling geometric data.

12. The method of claim 1 further comprising manufacturing the mold tooling with imperfections of depressions, dimples, or indents from the mold tooling geometric data.

13. The method of claim 1 further comprising manufacturing the mold tooling with imperfections of chips from the mold tooling geometric data.

14. The method of claim 1 further comprising manufacturing the mold tooling with imperfections of cracks from the mold tooling geometric data.

* * * * *